(No Model.)

W. M. SMITH & J. CALDWELL.
MECHANISM FOR TRANSMITTING ROTATIVE MOTION.

No. 427,374. Patented May 6, 1890.

WITNESSES:
A Van Wyck Budd
J Daniel Eby

INVENTOR
Wm M Smith
James Caldwell
BY
Guy C Wiegand
ATTORNEY

THE NORRIS PETERS CO., PHOTO-LITHO., WASHINGTON, D. C.

UNITED STATES PATENT OFFICE.

WILLIAM M. SMITH AND JAMES CALDWELL, OF PHILADELPHIA, PENNSYLVANIA.

MECHANISM FOR TRANSMITTING ROTATIVE MOTION.

SPECIFICATION forming part of Letters Patent No. 427,374, dated May 6, 1890.

Application filed April 17, 1889. Serial No. 307,555. (No model.)

*To all whom it may concern:*

Be it known that we, WILLIAM M. SMITH and JAMES CALDWELL, both citizens of the United States, and both residing at Philadelphia, in the county of Philadelphia and State of Pennsylvania, have invented certain new and useful Improvements in Mechanism for Transmitting Rotative Motion; and we do hereby declare the following to be a sufficiently full, clear, and exact description thereof as to enable others skilled in the art to make and use the said invention.

This invention relates to mechanism for transmitting rotary motion and changing the direction thereof, and has for its object the furnishing of an easily-applied mechanism, so supported and arranged as to run very smoothly with but little waste of power, and, while automatically lubricating its bearing parts, retaining the lubricant within itself without danger of soiling surrounding objects.

This invention, to accomplish these objects, consists in an arrangement of helically-toothed gear in an inclosing-case provided with shaft bearing oil-receptacles and oil-returning conduits, as hereinafter fully described and shown in the accompanying drawings, in which—

Figure 1:
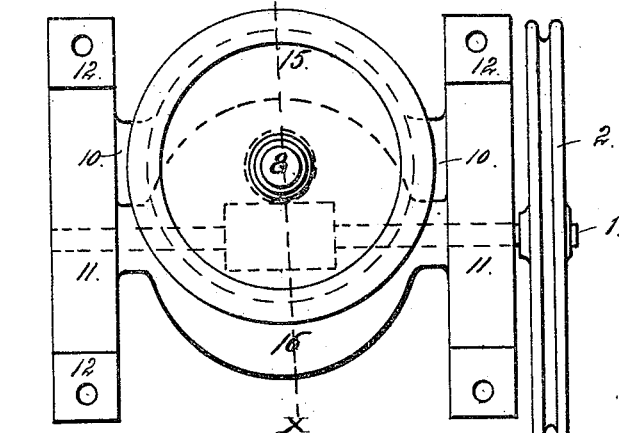
Figure 2:
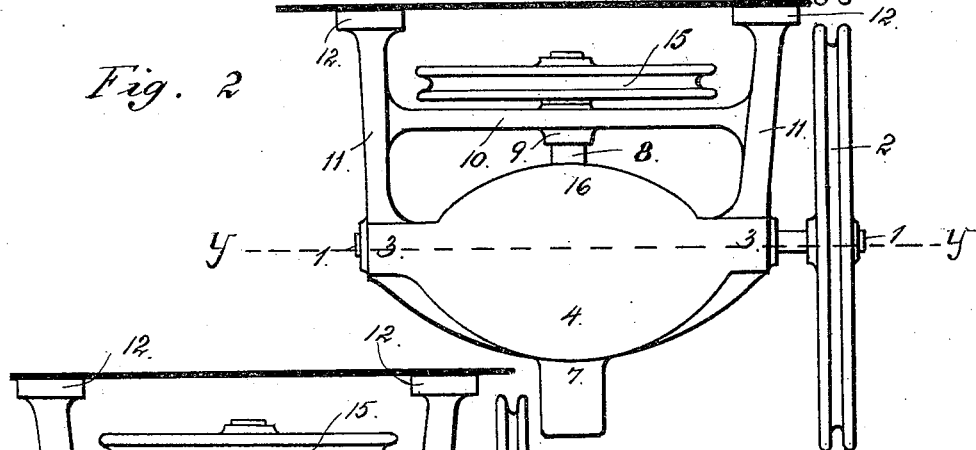
Figure 3:
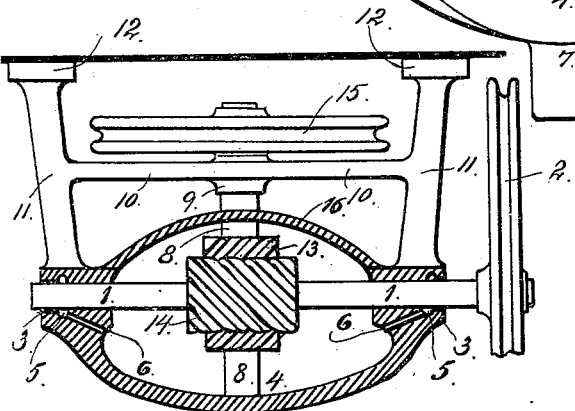
Figure 4:
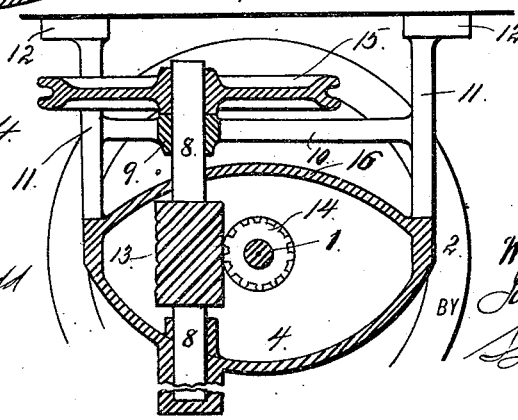

Figure 1 shows a plan; Fig. 2, a front elevation; Fig. 3, a vertical section in the plane indicated by the dotted lines X X in Fig. 1, and Fig. 4 a vertical section in the plane indicated by the dotted lines *y y* in Fig. 1.

Like reference-marks indicate the same parts in the several figures.

1 represents a horizontal shaft rotated by a pulley 2 secured thereon in bearings 3 3, formed on the sides of a basin 4. Annular grooves 5 5 are chambered out in each of the bearings 3 3, near to the outer ends, and are connected by ducts 6 6 with the cavity of the basin 4.

Upon the shaft 1, between the bearings 3 3, is a helically-toothed pinion 14, secured so as to turn with the shaft 1.

In the bottom of the basin 4 is formed a bearing 7 for an upright shaft 8, which passes through and turns in an upper bearing 9 in a brace uniting the arms 11 11, formed on the upper edge of the basin 4 and extending upward and terminating in pads 12 12, adapted to secure the apparatus to a beam or ceiling. The axis of the shaft 8 does not intersect that of the shaft 1, but is sufficiently far therefrom to permit the teeth of a helically-toothed pinion secured to and turning the shaft 8 to engage in the spaces between the teeth of the helically-toothed pinion 14.

A pulley 15 is secured to the upper end of the shaft 8 and serves to either receive or deliver power therefrom to an endless band, in the usual manner.

A cover 16 is applied to the basin 4 to exclude dust or other foreign substances.

The operation of this invention is as follows: The fixture being secured to a ceiling by the pads 12 and endless bands applied, the pulleys 15 and 2 to connect with driving and driven machinery, and oil being supplied to the basin 4, the rotation of the helically-toothed pinion 14, partially immersed in the oil, lifts the oil and lubricates the pinion 13, and also raises oil onto the shaft 1, which, passing into the bearings 3, lubricates them, and any excess of oil is arrested in the chambers 5 5 and flows through the channels 6 6 into the basin 4.

Either the pulley 15 or the pulley 2 may be used to receive or deliver power, according to the situation and requirements of the work to which it is applied.

This fixture proves very convenient for converting horizontal rotary motion into vertical rotary motion required for ventilating-fans and for many forms of mills. The transmission by this form of gearing is smooth, steady, and silent, and the thorough lubrication and retention of oil renders the apparatus light, cleanly, and durable.

Having described this invention, what we claim is—

The combination, with an apparatus for transmitting motion at different axial angles, of the basin 4, provided with bearings 3, having oil-arresting cavities 5, and returning-ducts 6, the cover 16, shafts 1 and 8, and pinions 13 and 14, the basin and cover forming an oblong or egg-shaped inclosure, whereby the pinions are protected and the flow of oil directed to the center of said basin, substantially as shown and described, and for the purpose set forth.

WM. M. SMITH.
JAMES CALDWELL.

Witnesses:
J. DANIEL EBY,
A. VAN WYCK BUDD.